J. R. SHOUPE.
SILO.
APPLICATION FILED DEC. 3, 1913.
1,131,798.
Patented Mar. 16, 1915.
2 SHEETS—SHEET 1.
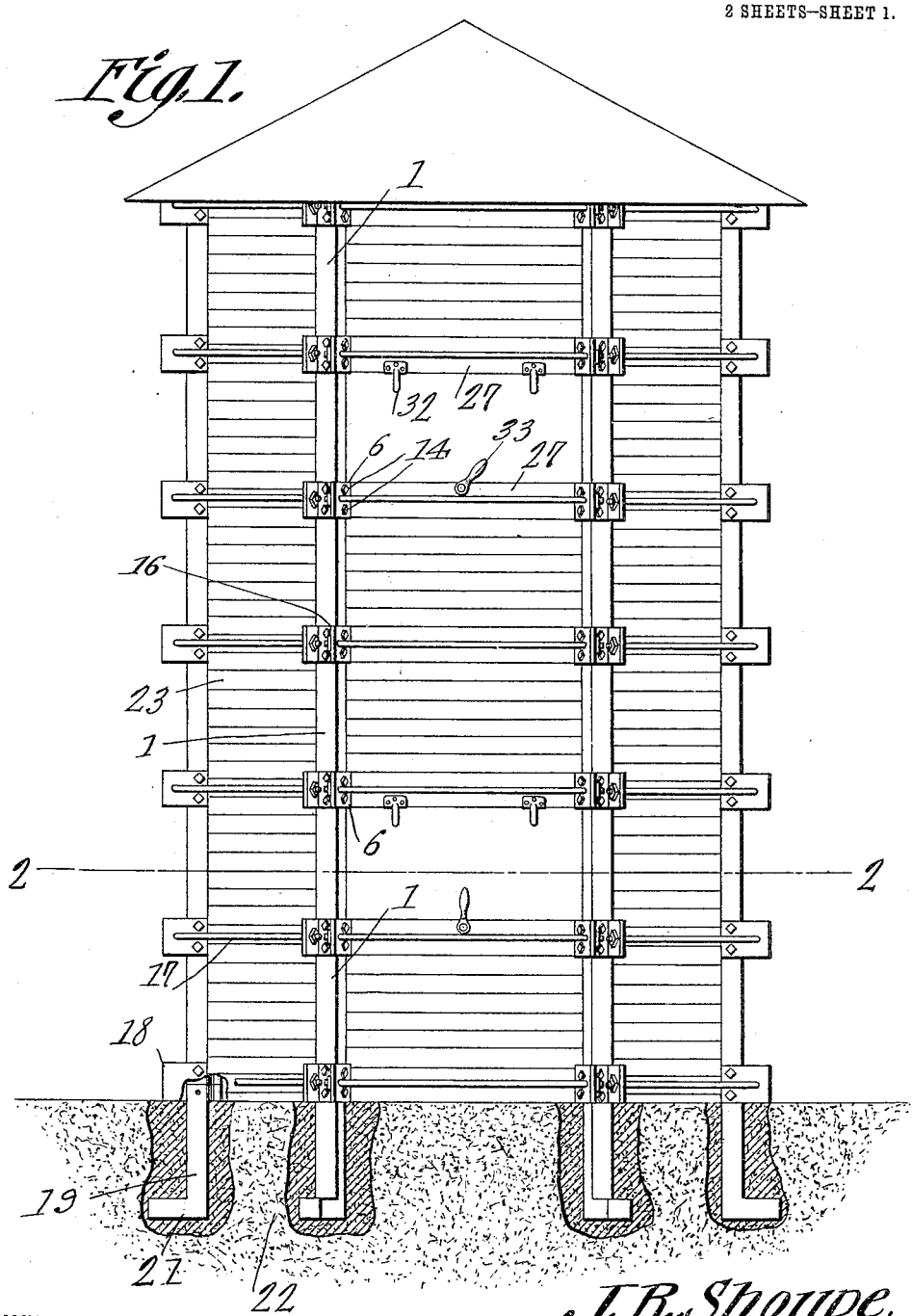

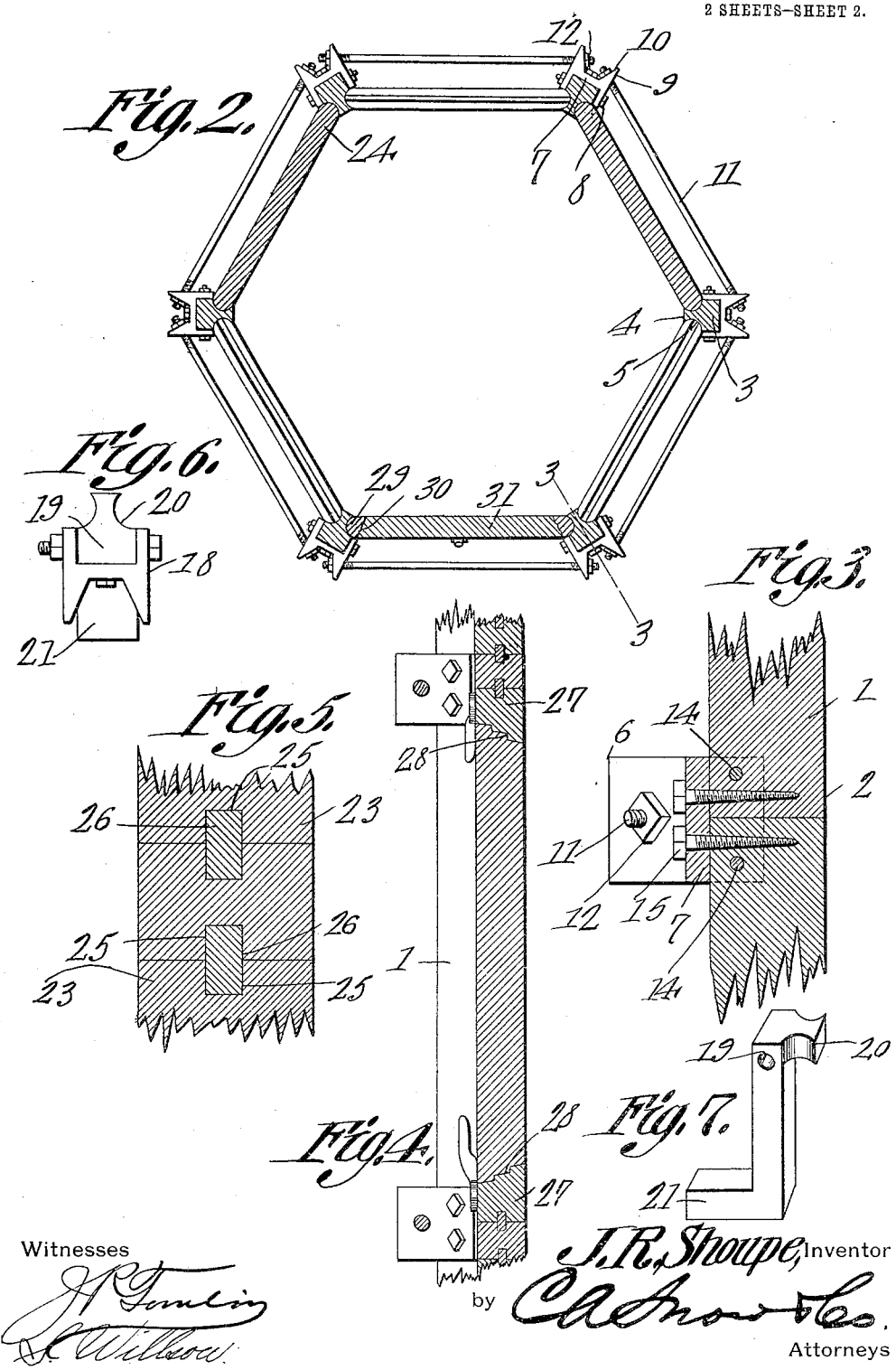

UNITED STATES PATENT OFFICE.

JOSEPH RICHARD SHOUPE, OF LONGVIEW, TEXAS.

SILO.

1,131,798.  Specification of Letters Patent.  Patented Mar. 16, 1915.

Application filed December 3, 1913. Serial No. 804,537.

*To all whom it may concern:*

Be it known that I, JOSEPH RICHARD SHOUPE, a citizen of the United States, residing at Longview, in the county of Gregg and State of Texas, have invented a new and useful Silo, of which the following is a specification.

The device forming the subject matter of this application is a silo and one object of the present invention is to provide a structure of this type which may be built up readily out of a plurality of relatively small stock units which may be handled easily.

Another object of the invention is to provide a silo which will be air-and-liquid tight.

The invention aims further to provide a silo so constructed that the wall strips, the door frames and the like may accommodate themselves readily to altered conditions resulting from a settling.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows the invention in front elevation, parts being broken away; Fig. 2 is a cross section on the line 2—2 of Fig. 1; Fig. 3 is a cross section on the line 3—3 of Fig. 2; Fig. 4 is a fragmental longitudinal section taken through one of the doors; Fig. 5 is a vertical transverse section taken through certain of the wall forming strips; Fig. 6 is a top plan of the anchor and associated parts; Fig. 7 is a perspective of the anchor.

In carrying out the present invention there is provided a plurality of posts 1 which are preferably formed in relatively short sections, the ends of the posts being in abutment, and there being any desired number of sets of posts, circumferentially of the silo, depending upon the contour of the structure.

As shown clearly in Fig. 3, the ends of adjacent posts of each set are in abutment as shown at 2.

Referring to Fig. 2 it will be observed that each post comprises an approximately rectangular body 3 provided with an inwardly extended wing 4 provided in its side faces with concaved recesses 5. The abutting ends of each pair of posts 1 are connected by supports 6, each support comprising a central web 7 and inwardly extending arms 8 which embrace the side faces of the meeting ends of the posts 1. The supports 6 comprise outwardly extended arms 9 beveled upon their adjacent faces as shown at 10. From the foregoing it will be observed that the supports 6 are of approximately H-shape.

The arms 9 of the supports of the respective sets of posts are connected by rods 11 having nuts 12 which bear against the beveled faces 10 of the arms 9. Bolts 14 or the like pass through the arms 8 and serve to connect the abutting ends of the posts 1 with the supports 6. If desired, lag screws 15 may pass through the webs 7 of the supports 6 and enter the forward faces of the ends of the posts 1. The supports 6 above described are located at the meeting ends of the posts. If desired, other supports 16 fashioned like the supports 6 may be straddled upon each post section 1, intermediate its ends, as shown at 16, the supports 16 of the respective sets of posts being connected as before by means of rods 17. The lowermost posts 1 may be provided with supports 18 of the sort hereinbefore described, the supports 18 being connected with anchors 19, each anchor 19 having a rearwardly projecting, concaved wing 20, corresponding to the wing 4 of the post 1 and located beneath the same, each anchor comprising a forwardly extending foot 21, the anchors being embedded in a foundation 22 which may be of concrete or the like.

The posts 1 preferably are fashioned from wood, the several supports 6, 16 and 18 being made of metal, and the rods 11 and 17 of course being fashioned from this substance.

The invention further comprises a plurality of wall strips 23. These wall strips 23 are provided with rounded ends 24 registering in the concaved recesses 5 of the posts 1, the rounded ends of the lowermost wall strips being received in the concaved wings 20 of the anchors 19 at the bottom of the silo.

The abutting horizontal edges of the wall strips 23 are provided with grooves 25 receiving removable key rods 26, the ends of which if desired, may be rounded so as to fit in the recesses 5.

Certain of the wall strips, denoted specifically by the numeral 27 may be spaced apart, so as to define any desired number of doorways in the silo. These terminal wall strips 27, as shown in Fig. 4, are shouldered as indicated at 28 to coöperate with a door 31.

Mounted in the recesses 5 of the posts 1 between the terminal wall strips 27 are stiles 29, conforming upon one face to the recesses 5 and upon the other face shouldered as indicated at 30 to coöperate with the door 31.

Any suitable means may be provided for holding the door 31 in place. In the present instance, the upper terminal wall strip 27 is provided with keepers 32 which overhang the door 31, the lower terminal wall strip being provided with a movable latch 33 which is adapted to retain the door.

Especial attention is directed to the fact that the silo herein disclosed may be built with a small expenditure of effort. The lower posts 1 may be connected with the anchors 19 and the wall strips 23 and the key rods 26 may be dropped into place, one after another, in the concaved recesses 5. When the silo thus has been built up by the height represented by the height of the lowermost post 1, a second post may be mounted in place and held to the lower post by means of the supports 6, another series of wall strips 23 being added, the operation being continued until the structure has arrived at the desired height.

From the foregoing description it will be observed that the silo may be taken down readily, piece by piece, and be moved to a new location. Instead of taking down the silo piece by piece, it may be taken down in sections, each section being represented by the length of one of the posts 1.

It is to be observed that owing to the fact that the ends of the wall strips 23 are rounded as shown at 24, to fit in the concaved recesses 5, it is unnecessary to cut different bevels upon the ends of the wall strips so as to enable the operator to build silos of different configurations, the rounded ends of the wall strips rocking or tilting readily into the concaved recesses 5 to permit the contour of the silo to be altered. Further, the wall strips 23 will move vertically in the concaved recesses 5 of the posts 1, and thus the silo will not open, even though the same settles. The removable rods 26 which, like the wall strips are fashioned from wood, afford tight joints between successive walls strips. Owing to the fact that the key rods 26 are separate elements, a rotten key rod may be removed without destroying one of the wall strips, and it is obvious that one or more wall strips which may be in a defective condition, may be taken out at any size.

The door stiles 29 have a vertical movement in the recesses 5 of the posts 1 and thus a settling of the silo will be ineffectual to cause a distortion of the doorway, the door 31, the stiles 29 and the terminal wall strips 27 settling along with the rest of the structure.

This device is so constructed that the units whereof the same is made may be carried in stock, in quantity, by any lumber merchant or saw mill. It is possible, therefore, for the owner of a silo at any time to secure one or more new units and to insert the same readily in the place of defective parts.

In the building up of the silo, a light scaffold of any kind may be assembled with the circumscribing rods, but since a silo cannot be characterized patentably by any form of scaffold structure, no scaffold structure has been shown.

It is to be observed that the use of continuous, circumscribing bands is avoided, their place being taken by a plurality of short rods connected to the supports 6, it being common and well known that the handling and insertion of continuous circumscribing bands in a silo structure, is one of the most unsatisfactory parts of the constructive operation.

Having thus described the invention, what is claimed is:—

1. A silo embodying posts each comprising superposed sections; and means for uniting the adjacent ends of the sections of one post with each other and with the adjacent ends of the sections of an adjoining post, all of the sections being of equal length to permit the location of any section at any point between the top and bottom of any post, each section being provided with concaved recesses in its sides, the recesses being symmetrical to permit either end of a section to be disposed uppermost; and a plurality of superposed wall-forming panels having rounded ends mounted to rock adjustably in the recesses to provide for an increase in the circumference of the silo, the rounded ends being symmetrical to afford an end for end reversal of the panels and to permit either face of each panel to be outwardly disposed.

2. A silo embodying posts each comprising superposed sections; and means for uniting the adjacent ends of the sections of one post with each other and with the adjacent ends of the sections of an adjoining post, all of the sections being of equal length to permit the location of any section at any point between the top and the bottom of any post, each section being provided with concaved recesses in its sides, the recesses being symmetrical to permit either end of a section to be disposed uppermost; a plurality of superposed wall-forming panels having rounded ends mounted to rock for adjustment in the recesses, thereby to provide for an increase in the circumference of the silo, the panels having recesses in their upper and lower edges; and stop strips seated in the recesses, the recesses being symmetrically disposed with respect to the inner and outer faces of the panels to permit both a transverse and an end for end reversal of any panel.

3. A silo comprising spaced sets of superposed posts; H-shaped supports extended across the meeting ends of the posts of each set, each support comprising rearwardly extended wings engaging the side portions of the posts, and spaced, forwardly extended wings having openings; and binding means lodged in the openings.

4. A silo comprising spaced sets of superposed posts; H-shaped supports extended across the meeting ends of the posts of each set, each support comprising rearwardly extended wings engaging the side portions of the posts, and spaced forwardly extended wings; and independent connecting means uniting the respective forwardly extending wings of the supports of one set with the corresponding wings of the supports of an adjoining set.

5. A silo comprising spaced sets of superposed posts; H-shaped supports extended across the meeting ends of the posts of each set, each support comprising rearwardly extended wings engaging the side portions of the posts, and spaced forwardly extended wings; independent connecting means uniting the respective forwardly extended wings of the supports of one set with the corresponding wings of the supports of an adjoining set; and securing devices passing through the supports, between the forwardly extended wings and entering the forward faces of superposed adjacent posts.

6. A silo comprising spaced sets of superposed posts; H-shaped supports extended across the meeting ends of the posts of each set, each support comprising rearwardly extended wings engaging the side portions of the posts, and spaced forwardly extended wings; independent connecting means uniting the respective forwardly extended wings of the supports of one set with the corresponding wings of the supports of an adjoining set; and securing devices engaging the rearwardly extending wings of each support and entering the side faces of superposed, adjacent posts.

In testimony that I claim the foregoing as my own, I have hereto affixed my signature in the presence of two witnesses.

JOSEPH RICHARD SHOUPE.

Witnesses:
M. L. CUNNINGHAM,
L. L. EDDINS.

Copies of this patent may be obtained for five cents each, by addressing the "Commissioner of Patents, Washington, D. C."